(12) United States Patent
Parent et al.

(10) Patent No.: US 7,389,216 B2
(45) Date of Patent: Jun. 17, 2008

(54) RELIABILITY TESTING OF SOFTWARE MODULES

(75) Inventors: Gershon Parent, Seattle, WA (US); Shanon Isaac Drone, Kirkland, WA (US); Troy David Barnes, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 10/999,583

(22) Filed: Nov. 29, 2004

(65) Prior Publication Data

US 2006/0129870 A1 Jun. 15, 2006

(51) Int. Cl.
*G06F 9/44* (2006.01)
*G06F 11/00* (2006.01)
(52) U.S. Cl. ................................. 703/21; 714/1
(58) Field of Classification Search ............... 714/1, 714/100; 703/20–22, 21
See application file for complete search history.

(56) References Cited

U.S. PATENT DOCUMENTS

| 5,548,718 | A  | * | 8/1996 | Siegel et al. ............. 714/38 |
| 6,047,389 | A  | * | 4/2000 | Thai ....................... 714/38 |
| 6,557,120 | B1 | * | 4/2003 | Nicholson et al. ......... 714/38 |
| 6,766,481 | B2 | * | 7/2004 | Estep et al. ............. 717/124 |

\* cited by examiner

*Primary Examiner*—Paul L Rodriguez
*Assistant Examiner*—Eunhee Kim
(74) *Attorney, Agent, or Firm*—Christensen O'Connor Johnson Kindness PLLC

(57) ABSTRACT

A system and method for testing the reliability of a target module is presented. A reliability testing module executes a testing script by directing the target module to perform various functions, and by further consuming system resources by executing test applications. The behaviors of the target module are recorded and evaluated, and a reliability score is generated for the target module. The reliability score enables a user to compare the reliability of a first target module to that of a second.

6 Claims, 5 Drawing Sheets

RELIABILITY TESTING OF SOFTWARE MODULES

FIELD OF THE INVENTION

The present invention relates to testing computer system software, and more particularly, to testing the reliability of software modules on a computer system.

BACKGROUND OF THE INVENTION

Most computers today, especially the ubiquitous personal computers, can be configured with any number of devices from a variety of vendors. For example, the typical personal computer can be configured from a variety of graphic display systems, scanners, input devices such as a mouse or digitizing pad, network interface cards, and Web cameras, to name just a few. Indeed, the possibilities often seem endless.

Competition among the various vendors is often quite fierce. In order to attract buyers, vendors frequently promote their products according to the speed with which they can complete a certain task or tasks on a given computer system. For example, with respect to graphic display systems, third-party vendors often promote their graphic display systems according to speed-related benchmarks achieved by their product when run against a benchmark suite. Industry-related magazines and publications often review, promote, and/or endorse products based on these benchmark results. Correspondingly, many users purchase third-party devices based on the various benchmarks published or associated with a device. Almost universally, benchmarks are speed-related evaluations.

As those familiar with the computer industry will recognize, third-party vendors often analyze the benchmark suite, examining and analyzing the methodologies by which the benchmarks are derived. Such analysis provides the vendors with invaluable insight as to what exactly is sought by reviewers (and presumably customers), and also provides insight as to how they may improve their products to achieve better benchmark scores. Unfortunately, this information often leads a vendor to optimize their product for benchmark purposes, frequently turning to complex processing, shortcuts, and raising (even exceeding) operating limits. Whether or not a vendor intentionally does so, these "optimizations" tend to sacrifice operating stability for benchmark performance, i.e., speed.

One area that is often sacrificed to optimization for performance sake is the interface between a computer's operating system and the hardware device, hereafter referred to as the "device driver." Indeed, the device driver is a logical choice for optimization, as its modification represents the least expensive course, and one that could yield substantial results, for a vendor. Unfortunately, device driver failures account for a substantial percentage of computer system crashes. According to some statistics, at least one out of every four system crashes is attributable to a device driver malfunction.

While market forces typically drive vendors to optimize their products for improved speed, there is an unfortunate lack of a complimentary force that encourages vendors to produce stable products, i.e., those that will not cause system crashes. In other words, there is currently no system available that benchmarks or measures the stability of a product in the same way that benchmarks are available for speed/performance. It should be noted that many operating system providers provide a compatibility certification for third party products, including devices. In other words, if a vendor meets the established baseline of compatibility with an operating system, the operating system provider will permit the vendor to advertise that its product has been certified as compatible with the operating system. Unfortunately, such certification simply indicates that a product has met some minimum level of compatibility, and does not provide a consumer with any information by which a comparison may be made between products. In fact, there is a general need in the computer industry for a stability benchmark rating of products. The present invention addresses these needs and other issues found in the prior art.

SUMMARY OF THE INVENTION

In accordance with aspects of the present invention, computer system for generating a reliability rating for a target module is presented. The computer system comprises a processor that executes the target module; a memory, the memory storing the target module; and a reliability testing module configured to test the reliability of the target module. To determine a reliability rating for the target module, the reliability testing module executes a testing script in conjunction with the operation of the target module. The reliability testing module evaluates the behavior of the target module in response to the execution of the testing script. The reliability testing module then generates a reliability rating according to the evaluated behavior of the target module. The reliability rating is a value by which the reliability of the target module may be compared to the reliability of a second target module to determine which target module is more reliable.

In accordance with additional aspects of the present invention, a method for determining the reliability of a target module is presented. A target module is executed on a computing device. A testing script to test the reliability of the target module is executed. The behavior of the target module is monitored in response to executing the testing script. A reliability rating is generated according to the monitored behavior of the target module. The reliability rating is a value by which the reliability of the target module may be compared to the reliability of a second target module to determine which target module is more reliable.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
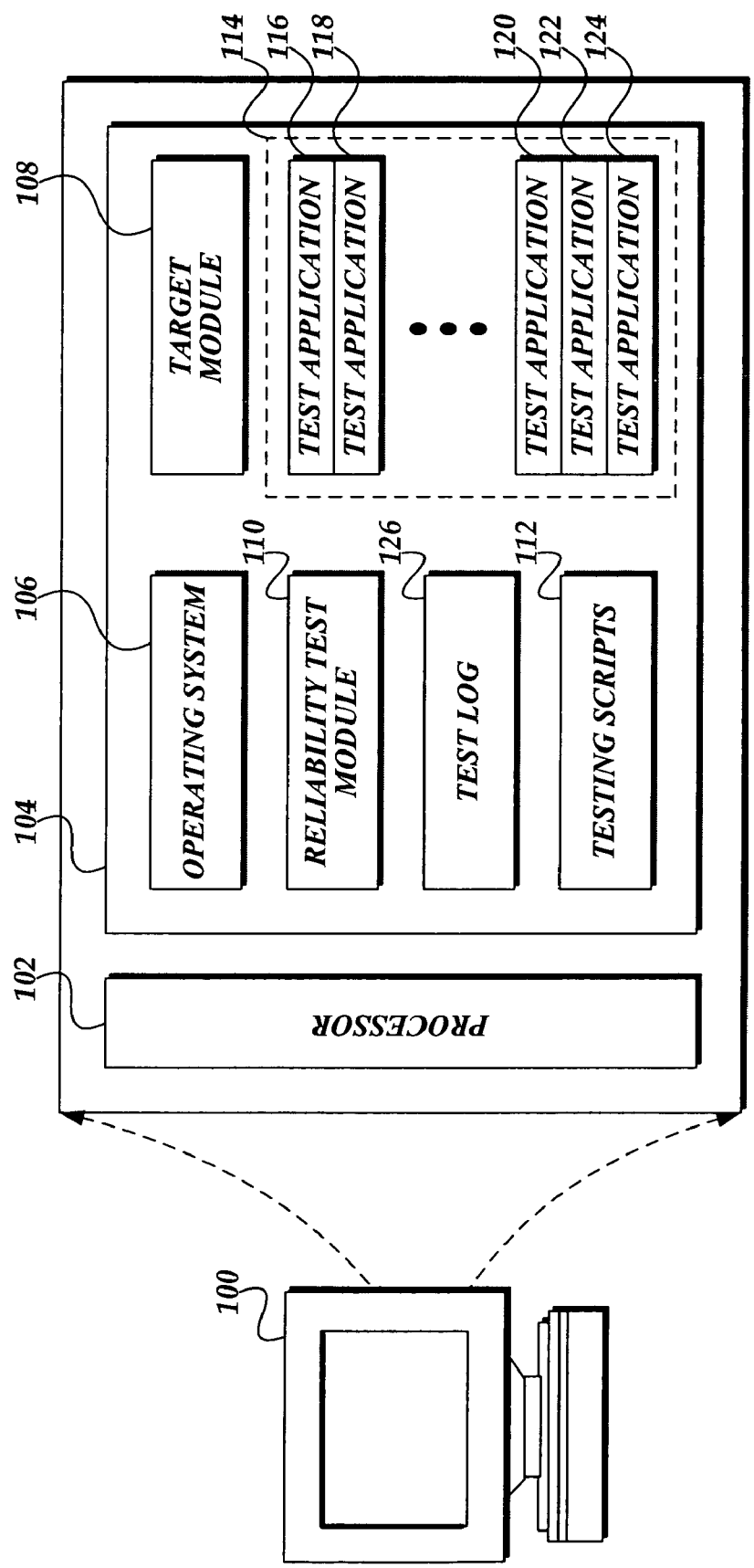
FIG. 1 is a pictorial diagram illustrating an exemplary computer system suitable for implementing aspects of the present invention.

As mentioned above, FIG. 1 is a pictorial diagram illustrating an exemplary computer system 100 suitable for implementing aspects of the present invention. The computer system 100 includes a processor 102 and memory 104. As those skilled in the art will appreciate, the memory comprises both volatile and non-volatile memory for storing a variety of items, including an operating system, software applications, data files, and the like. As shown in exemplary FIG. 1, the memory 104 includes an operating system 106 which, as those skilled in the art will appreciate, provides an environment in which other applications and modules may operate.

The computer system also includes, typically in the memory 104, a target module 108 which is the subject matter to be tested for reliability. The computer system 100 tests the target module 108 using a reliability test module 110. The reliability test module 110 may be running/executing prior to the execution of the target module 108 and load the target module as part of the reliability test process, or alternatively, may commence the test process on an already executing target module.

Those skilled in the art will recognize that application start-up and shut-down procedures, both with a target module as well as other applications, account for a substantial portion of reliability issues, such as system crashes, program crashes, malfunctions, and the like. Thus, one way to test a target module is to launch other test applications during the testing of the test module. Accordingly, the computer system 100 may also include a set of test applications 114, including a set of test applications, such as test applications 116-124. As described below, the timing of starting and stopping test applications 114 is controlled according to a predetermined testing script.

According to aspects of the present invention, the reliability test module 110 exercises the target module 108 according to one or more predetermined testing scripts 112. The testing scripts 112 include instructions which the reliability test module 110 cause to occur, including causing the target module to perform various functions. In addition, the testing scripts 112 may also include instructions to the reliability test module 110 to perform various actions that affect the computer system 100 generally. For example, a testing script may include instructions to load any number of test applications 114 to consume system resources, compete for processing time, interact with the target module 108, and the like. It should be noted that a testing script may be embodied in various forms. For example, a testing script may be a document or file written in a computer readable format, such as an HTML, XML, JavaScript, or other formatted files. Alternatively, a testing script may be encoded in computer readable format. As still another alternative, the testing script may be generated on the fly, such as by a random selection of instructions for the target module. Still further, the testing script may be hard coded into the reliability test module 110, or some other application supplying instructions to the reliability test module. It should be appreciated, however, that the above examples are illustrative only, and should not be construed as limiting upon the present invention. Another item included in the computer system 100 is a test log 128. As the reliability test module 110 exercises the target module 108, the actions taken by the reliability test module are recorded in the test log 128. Similarly, the behavior of the target module, as well as computer system conditions, are also recorded into the test log 128. By recording the various actions taken, computer system conditions, and target module 108 results, reliability issues related to the target module 108 can be identified, and a reliability score for the target module can be determined. According to aspects of the present invention, the reliability test module 110 records information into the test log 128 on a predetermined periodic basis. Alternatively, the reliability test module 110 records information into the test log 128 as testing script actions are executed. As yet another alternative, the reliability test module 110 records information into the test log 128 as actions are executed, and on a periodic basis.

Figure 2A:
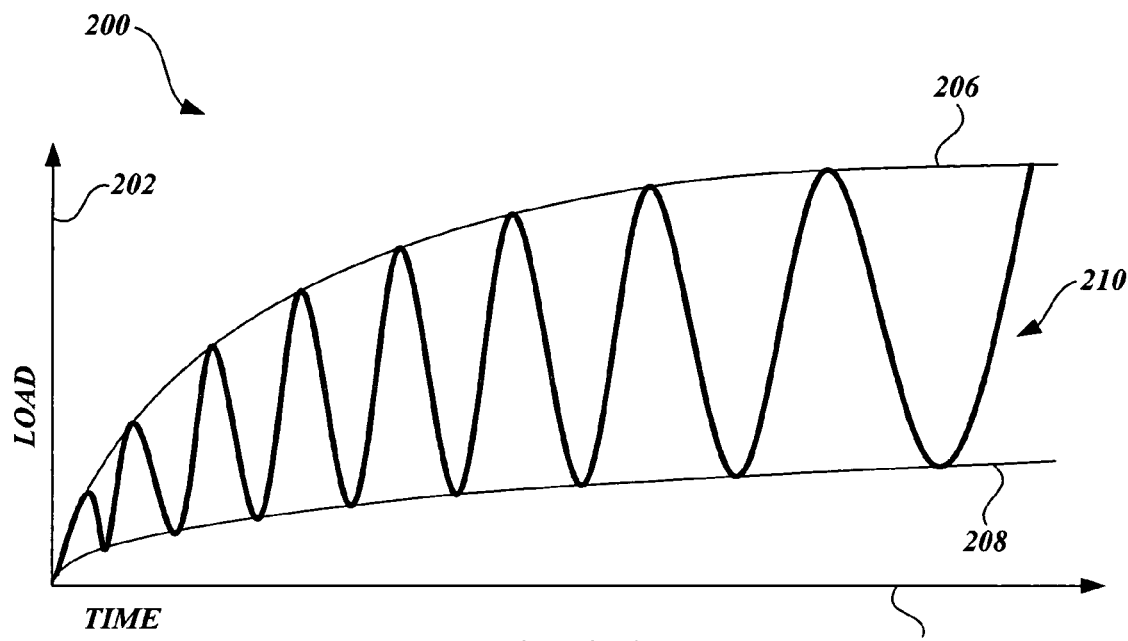
FIGS. 2A and 2B are pictorial diagrams illustrating exemplary system load/time graphs of varying the system load to test a target module.
Figure 2B:
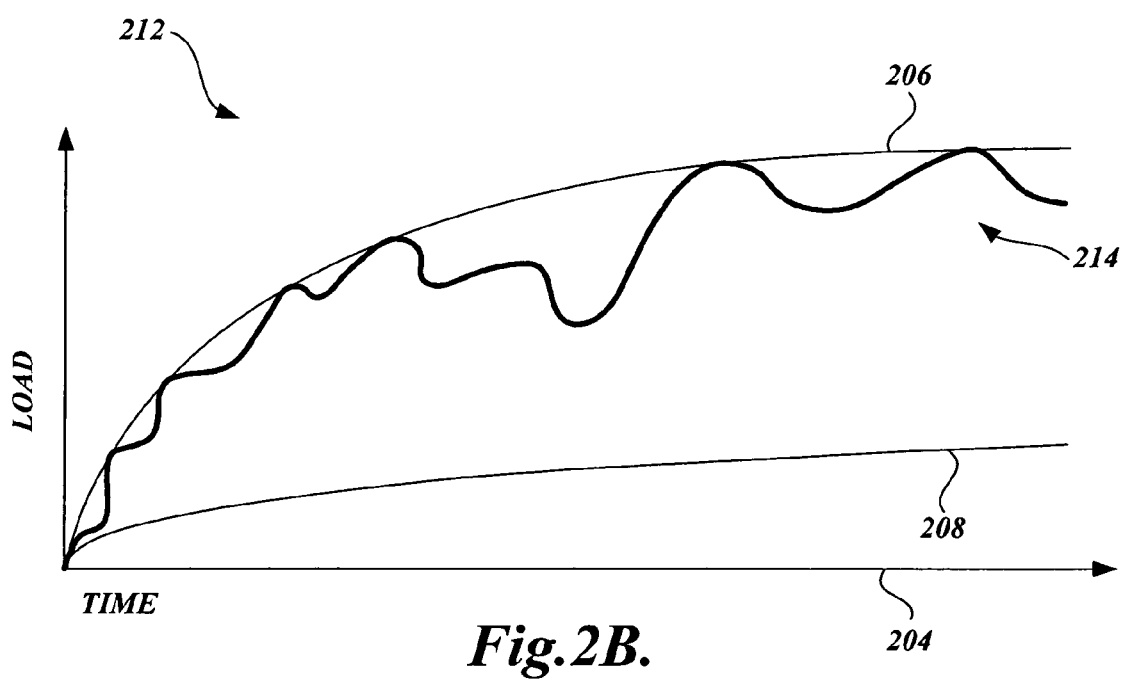

As indicated above, a test script may be configured to perform a variety of actions, actions directed to manipulate various functionality of the test module 108, as well as actions that indirectly impact the test module. FIGS. 2A and 2B are pictorial diagrams illustrating exemplary system load/time graphs 200 and 212 of varying the computer system load to test the target module 108, with the system load represented by line 202 and time represented by line 204.

In particular, with respect to FIG. 2A, a test script may be configured such that the system load 210, including both computer system resources consumed by the test module 108 due to the actions taken by the test script, as well as test applications loaded into the computer system by the test script, may fluctuate between a maximum system load level 206 and minimum system load level 208. Additionally, the maximum system load level 206 and minimum system load level 208 may increase or decrease over time 204. As shown in FIG. 2A, the system load 210 can be configured to fluctuate sinusoidally between the maximum and minimum load levels. However, the system load level may be configured to any particular levels over time, such as system load level 214 of graph 212 of FIG. 2B. Still further, while not shown, a testing script may be configured to maintain a constant system load, anywhere between a maximum system load 206 or a minimum system load 208 over a given period of time, or for the entire duration of the testing script process.

Figure 3:
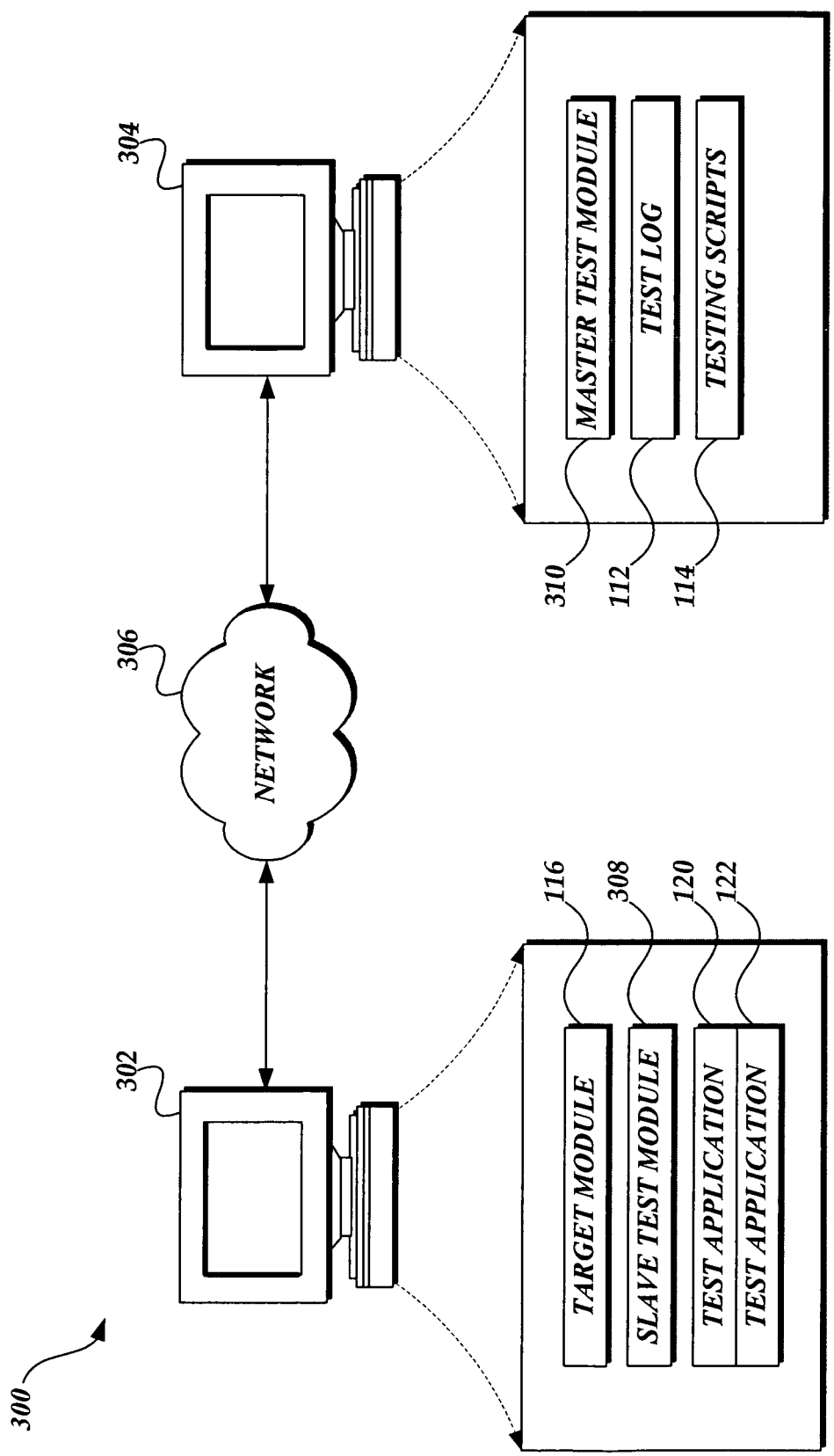
FIG. 3 is a pictorial diagram illustrating an alternative, exemplary network computer system suitable for implementing aspects of the present invention.

With reference to FIG. 1, it should be noted that while the present discussion has been directed at a single computer system, and more particularly at computer system 100, aspects of the invention may be suitably applied in a multi-computer environment, including a networked environment. FIG. 3 is a pictorial diagram illustrating an exemplary networked computing environment 300 suitable for implementing aspects of the present invention. As illustrated in FIG. 3, the exemplary computing environment includes a target computer 302 upon which the target module 108 is executed. The exemplary computing environment also includes a test computer 304, coupled to the target computer 302 via a communication network 306.

According to the exemplary networked environment 300, the test computer includes a master test module 310 that reads one or more test scripts 114 and sends the test instructions from the test script over the network 306 to a corresponding slave test module 308. The slave test module 308 carries out the instructions of the test scripts 114, both on the target module 116 as well as the computing environment of the target computer 302. For example, the slave test module 308 may direct the test module to perform various functions, as well as launch various test applications, such as test applications 120 and 122. As events occur, or on a periodic basis, or both, the slave test module 308 reports the actions back to the master test module 310 on the test computer 304, which records the various reports sent back by the slave test module 308 in the test log 112 for subsequent evaluation.

In evaluating the information in the test log 112 to determine a reliability score, any number of factors may be considered. For example, weight may be given to the length of time that the target module 116 continuously runs before failure/crash. Weight may also be given to the behavior of the target module 116 during high system load times. Still additionally weight may be given, if the target module crashes, as to whether the computer system, such as computer system 102, can continue to operate or whether the target module's crash caused a fatal system error. Other factors may also be given weight in determining a reliability score. Of course, as those skilled in the art will appreciate, should there be a crash, either of the target module 116 or the computer system, an evaluation must be made as to whether the target module was at least partially the cause of the crash, and only consider those instances where target module 108 is a direct contributor.

Another aspect of evaluating the information in the test log 112 to determine a reliability score is to aggregate or average the scores of multiple test passes, i.e., running a test script repeatedly, and generating an average reliability score based on the multiple passes.

Figure 4:
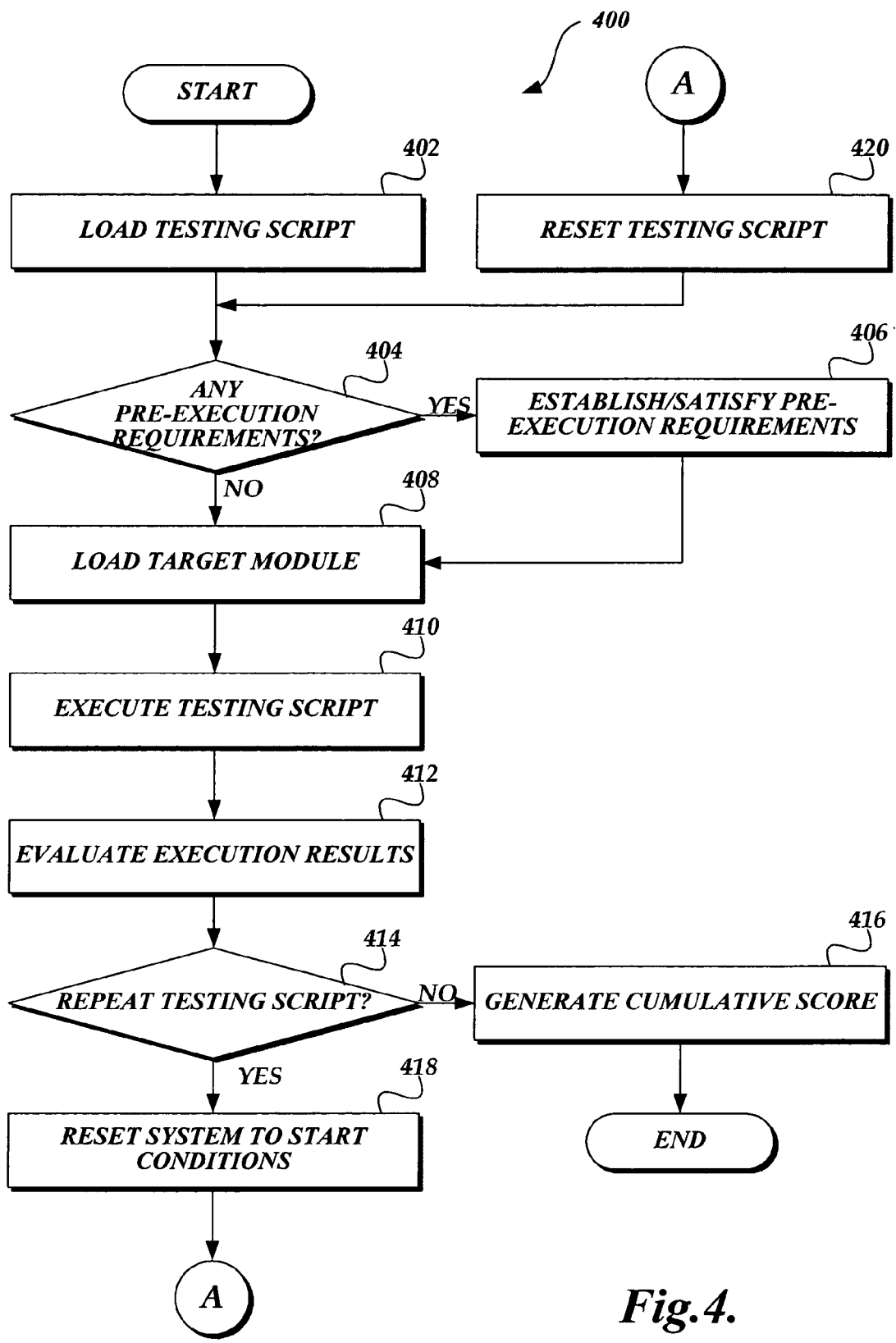
FIG. 4 is a flow diagram illustrating an exemplary routine for testing the reliability of target module and generating a reliability score for the target module.

FIG. 4 is a flow diagram illustrating an exemplary routine 400 for testing the reliability of target module 108 and generating a reliability score for that target module. Beginning at block 402, the reliability test module 110 loads a testing script 112. At decision block 404, a determination is made as to whether any pre-execution requirements must be established/satisfied before the testing script 112 can be executed. These requirements may include establishing a baseline system load level, ensuring that a particular hardware device is operational, connecting to a network, and the like. If there are pre-executing requirements, at block 406, the pre-execution requirements are satisfied and/or established.

At block 408, the target module 108 is executed. Alternatively, it should be noted that executing the target module may be specified as a pre-execution setting, or further alternatively, the target module 108 may be executing prior to loading the testing script. Thus, the order of loading the target module 108 as shown in FIG. 4 should be viewed as illustrative only, and not construed as limiting upon the present invention.

At block 410, the testing script 112 is executed. As mentioned above, executing a testing script 112 may involve sending instructions to the target module 108 to perform various functions, consuming computer system resources such as memory or disk space, launching one or more test applications 114. Commensurate with executing the test script 112 numerous factors are recorded in the test log 126. These factors include the behavior of the target module 108 in response to the test script 112, which test applications 114 were executed, the time that a particular event occurred, and the like.

At block 412, after having executed the test script, the information recorded in the test log is evaluated, thereby generating a preliminary reliability score for the test module 108. However, as mentioned above, the ultimate reliability score generated for the test module 108 may be an aggregation of multiple passes through the testing script 112. Accordingly, at block 414, a determination is made as to whether the testing script 112 should be repeated. If the testing script 112, or alternatively another testing script, should be repeated, at block 418, the computer system is optionally reset to the conditions when the testing started. At block 420, any variables or settings associated with the testing script 112 are reset. Thereafter, the routine 400 returns again to decision block 404 to determine whether an pre-execution requirements must be established, as described above.

Alternatively, if the test script 112, or another testing script, is not to be repeated, at block 416 a cumulative reliability score is generated for the target module 108. As indicated above, this may be an average of the scores generated from individual passes, and/or be a function of any number of factors identified during the execution of the testing script or scripts. Thereafter, the routine 400 terminates.

The reliability score is not simply a pass/fail score that indicates a minimum of compatibility. Instead, the reliability score, typically a numeric value, corresponds to the results of the reliability of the target module with respect to the testing scripts executed. Using this reliability score, a user can evaluate the reliability of the target module 108 in comparison to other, similar modules and determine which module is more likely to be reliable based on that score.

As previously mentioned, testing the reliability of the target module 108 may involve concurrently executing test applications 114 to provide an overall system load on the computer resources. However, just as with any testing environment, a static pattern does not always find problems with a test module 108 that a randomized pattern might. Thus, selecting the same test applications to provide an overall system load might not locate problems that could be found by randomizing or rotating the test applications executed to provide overall system load. Thus, according to aspects of the present invention, the test module 110, in addition to processing a test script to test the target module, rotates and/or randomizes the selection of test applications from the set of test applications 114 when directed to provide various levels of system load.

According to one embodiment, the test applications in the set of test applications 114 are executed in a queue fashion, i.e., first executed, first terminated. Thus, when the overall system load is to decrease by terminating a test application, the test application that has been executing for the longest amount of time is terminated. Similarly, when the overall system load is to be increased by executing a test application, a test application that has not yet been executed, or if all have been executed, the test application whose inactivity has been the longest is selected.

Additionally, to provide further alternation between test applications, according to one embodiment, test applications are replaced on a periodic basis. In other words, in addition to executing or terminating test applications to provide a desired level of a overall system load, on a periodic basis a currently executing test application is terminated and is replaced by executing another test application in the set of test applications 114.

Figure 5:
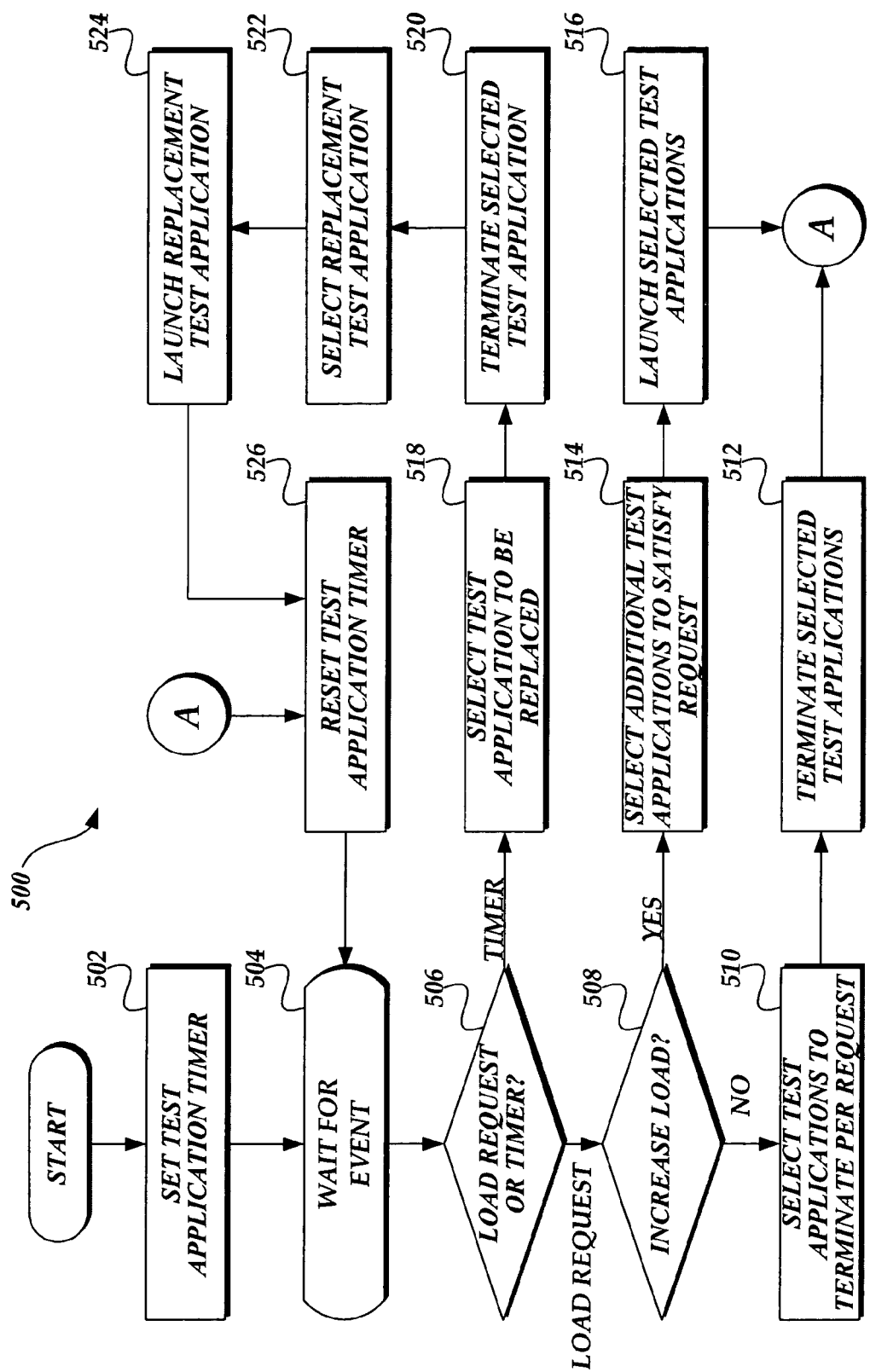
FIG. 5 is a flow diagram illustrating an exemplary routine for varying the test applications running on the computer system during the software reliability testing of a target module.

FIG. 5 is a flow diagram illustrating an exemplary routine 500 for varying the test applications 114 executing on the computer system during the software reliability testing of a target module 108. Beginning at block 502, a test application timer is set. Setting the test application timer ensures that test applications are cycled as the timer expires. Thereafter, at event block 504, the routine 500 waits for an event to occur. Events for which this routine monitors include both load request events from a reliability test module 110, or a timer event indicating a time to change one or more test applications executing on the computer system.

Upon detecting an event, at decision block 506 a determination is made as to the type of event that was detected. If the event was a load event from the reliability test module 110, at decision block 508 another determination is made as to whether the load event was to increase or decrease the system load. If the load event indicated a decrease to the overall system load, at block 510, a test application that is currently executing is selected. As mentioned above, selecting a test application to terminate may be based on a queue basis, i.e., the longest executing test application is the selected test application to be terminated. At block 512, the selected test application is terminated, and the routine 500 proceeds to block 526, where the test application timer is reset. Thereafter, the routine 500 returns again to event block 504 to await another event.

If, at decision block 508, the load request is to increase the system load, at block 514 one or more additional test applications are selected to satisfy the load request. At block 516, the selected test applications are launched. At block 526, the test application timer is reset and the process 500 returns again to event block 504.

At decision block 506, if the detected event is a timer event, at block 518 a currently executing test application is selected for replacement/rotation. As mentioned above, test applications may be alternated according to a longest executing/first terminated manner. At block 520, the selected test application is terminated. At block 522, a replacement test application is selected. Selecting a replacement test application may be performed according to a variety of criteria including the particular resources that a test application may use, the amount of time since the test application has been executed, the amount of resources that a test application consumes, and the like. After selecting the replacement test application, at block 524 the selected test application is launched/executed. The routine 500 then proceeds to block 526, where the test application timer is reset. Thereafter, the routine 500 returns to event block 504 to await another event.

No ending block is identified in the exemplary routine 500. It is anticipated that the exemplary routine 500 terminates when the reliability testing terminates.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computer system for generating a reliability rating for a target module, the computer system comprising:
   a processor that executes the target module;
   a memory, the memory storing the target module and a testing log;
   a set of test applications for testing the reliability of the target module; and
   a reliability testing module configured to test the reliability of the target module by:
      executing a testing script in conjunction with the target module, wherein executing the testing script comprises controlling the overall system load on the computer system resources; and wherein executing the testing script further comprises executing a plurality of test applications in response to an instruction in the testing script, wherein the reliability testing module periodically selects a first test application that is currently executing, and replaces the first test application with a second test application that is not currently executing from the set of test applications;
      recording behaviors of the target module in response to the testing script in the testing log; and
      generating a reliability rating according to the recorded behaviors of the target module, wherein the reliability rating is a value representing the relative reliability of the target module suitable for comparison to the reliability rating of a second target module.

2. The computer system of claim 1, wherein the reliability testing module is further configured to execute the target module on the computer system in order to test the reliability of the target module.

3. The computer system of claim 2, wherein the reliability testing module executes the target module in response to an instruction in the testing script.

4. The computer system of claim 1, wherein the reliability testing module begins executing the testing script with the target module already executing on the computer system.

5. A method for determining the reliability of a target module, the method comprising:
   executing a target module on a computing device;
   executing a testing script corresponding to the target module to test the reliability of the target module, wherein executing the testing script comprises controlling the overall system load on the computer system resources, wherein executing the testing script further comprises executing a plurality of test applications from a set of test applications in response to an instruction in the testing script to test the reliability of the target module;
   periodically selecting a first test application that is currently executing, and replacing the first test application with a second test application from the set of test applications that is not currently executing;
   monitoring behaviors of the target module in response to executing the testing script and recording the monitored behaviors of the target module in a testing log; and
   generating a reliability rating according to the monitored behaviors of the target module, the reliability rating being a value representing the reliability of the target module suitable for comparison to the reliability rating of a second target module.

6. A computer-readable storage medium bearing computer-executable instructions which, when executed on a computer system, implement a method for determining the reliability of a target module, the method comprising:
   executing a target module on a computing device;
   executing a testing script corresponding to the target module, wherein executing the testing script comprises controlling the overall system load on the computer system to test the reliability of the target module, and wherein executing the testing script further comprises executing a plurality of test applications from a set of test applications in response to at least one instruction in the testing script to test the reliability of the target module;
   periodically selecting a first test application that is currently executing, and replacing the first test application with a second test application from the set of test applications that is not currently executing;
   monitoring the behaviors of the target module in response to executing the testing script and recording the monitored behaviors of the target module in a testing log; and
   generating a reliability rating according to the monitored behavior of the target module, the reliability rating being a value representing the relative reliability of the target module suitable for comparison to the reliability rating of a second target module.

* * * * *